US005218605A

United States Patent [19]

Low et al.

[11] Patent Number: 5,218,605

[45] Date of Patent: Jun. 8, 1993

[54] SOFTWARE MODULES FOR TESTING COMPUTER HARDWARE AND SOFTWARE

[75] Inventors: Danny Low, Mountain View; Myron R. Tuttle, Santa Clara, both of Calif.

[73] Assignee: Hewlett-Packard Company, Palo Alto, Calif.

[21] Appl. No.: 472,694

[22] Filed: Jan. 31, 1990

[51] Int. Cl.[5] ........................ G06F 11/00; G06F 11/26

[52] U.S. Cl. ........................ 371/16.1; 371/19; 371/25.1; 395/575

[58] Field of Search ........................ 371/25.1, 19, 16.1, 371/22.4; 382/18, 57

[56] References Cited

U.S. PATENT DOCUMENTS

| | | | |
|---|---|---|---|
| 4,064,561 | 12/1977 | Jennings | 364/900 |
| 4,075,604 | 2/1978 | Degasperi | 382/18 |
| 4,441,205 | 4/1984 | Berkin et al. | 382/18 |
| 4,569,049 | 2/1986 | McNamara | 371/25.1 |
| 4,617,663 | 10/1986 | Lake et al. | 371/25.1 |
| 4,696,003 | 9/1987 | Kerr et al. | 371/19 |
| 4,953,165 | 8/1990 | Jackson | 371/25.1 |
| 5,002,028 | 6/1991 | Edmonds et al. | 371/25.1 |

OTHER PUBLICATIONS

Atron, Evaluator, 1989.
"The Atron Evaluator."

*Primary Examiner*—Jerry Smith
*Assistant Examiner*—Henry C. Lebowitz
*Attorney, Agent, or Firm*—Roland I. Griffin; Alan H. Haggard

[57] ABSTRACT

A computer software-related device and method uses regression testing techniques for testing computer hardware and/or software application(s). Input data and commands from a user are stored, and are sent to a hardware/software system under test. Signatures (representative of visual display data) which are received (with a selected prevalence) as a result of the sent input data and commands are also stored. On command of a user, the stored signatures, input data and commands are subsequently sent to the hardware/software system under test, and new signatures are generated. These new signatures are compared with the stored signatures, and the results of this comparison are used as an indication that the hardware/software system under test is performing as expected.

7 Claims, 12 Drawing Sheets

SOFTWARE MODULES FOR TESTING COMPUTER HARDWARE AND SOFTWARE

This application relates to U.S. patent application 07/472,689 entitled "Visual Display Signal Processing System And Method" and U.S. patent application 07/412,697 entitled "System and Method for Testing Computer Hardware and Software", which are incorporated by reference herein.

BACKGROUND OF THE INVENTION

1. Field Of The Invention

The present invention relates to a computer program for testing computer hardware and software applications, and specifically relates to an automated form of testing known as regression testing, utilizing comparisons of data representative of data from visual display devices.

2. Related Art

Computer programs used for testing software applications exist which can receive input data, such as key strokes, which are recognized by the software application. Upon receipt of the input data, these computer programs have the ability to store the input data (into files called test scripts), and to replay them such that the software application functions as though a user were actually typing the input data into the software application. In this way, input data can be repeatedly fed into the software application, with a user creating a test script by entering the input data only once.

By using such a computer program, a software application can be executed using a prepared test script, so as to verify that the software application performs as expected. This can be accomplished by somehow comparing previously stored results with results which were subsequently acquired by replaying the test script through the software application. The fact that the software application performs as expected can also be used as an indication that the hardware on which the software application runs is performing as expected. The combination of the hardware on which the software application runs (including a visual display device) and software application under test running thereupon is often referred to as the System Under Test (SUT). The computer program for testing the SUT will be referred to as Regression Testing (RT) software.

RT software has important functions in the software development industry, where during the process of developing a software application, it is often desirable to run each new version of the software application through a long series of test steps. In addition, in the production of computer hardware, it is also often desirable to test each manufactured unit by running a software application on the hardware through a series of steps.

The conventional method for regression testing of hardware and/or software applications was by having a user manually enter input data each time a new piece of hardware and/or new version of a software application was to be tested. The user would then verify that the new version responded to the input data in the same way that a previous version responded to the same test data. This method of regression testing was replete with difficulties, since it was very time intensive, error-prone, and extremely inadequate for production testing or development purposes. In addition, it did not allow for performance measurements and compatibility comparisons of the software application in real-time.

One device for automating the regression testing process was a device jointly developed by Hewlett Packard Corporation and Telamon Corporation of California called Automan. The RT software on Automan provides for capture of test scripts in the form of keystrokes on a keyboard, movements of a mouse, etc. The RT software also provides for replay of these test scripts, and this device replays the test scripts as captured on the software application. A comparison is then made between the data passed from the computer to the terminal, and the originally input data. However, the RT software on Automan does not perform or receive results of comparisons of the visual display device. Thus, the method employed by the Automan device is not a thorough regression testing method, since it is still possible for the data to be typed in correctly, but for the visual display data to be incorrect.

Some of the earlier RT software programs utilized the concept of fixed pacing, which meant that the input data was sent to the software application on the SUT at a fixed interval, rather than determining when the software application was ready to retrieve the next step. Fixed pacing is undesirable, however, for several reasons. First, it may be important in many instances that the input data reach the software application at the appropriate time (that is, it is not enough to merely buffer the input data). Second, since feedback from the SUT is not being gathered during fixed interval testing, performance measurements of components of the SUT cannot be measured. Automan is an example of a fixed pacing device, in that there is a synchronizing mechanism used in conjunction with the terminal.

In addition to the above-mentioned RT software, attempts at applying software patches or modifying the software application itself to create performance measurement data were unsuccessful, since this changed the normal behavior of the software application in unpredictable ways. These intrusive behavior changes often prohibited accurate performance measurements of the software application.

The inventor's realized that what was needed was RT software for preparing and re-playing a test script for software applications running on an SUT, and comparing visual display data with previously stored visual display data in a non-intrusive manner. Problems identified and encountered by the inventors of the present invention with the implementation of such RT software are:

1. A visual display device having more than one valid state (for example, text and graphics) may often be between states at the time that the visual display data is captured. Transferring, storing, and checking for such transitory states results in a large waste of computer time.

2. In general, the visual display data capturing program must be written to coexist with the application being tested and not to interfere with its normal operation.

3. Data transfer time and comparison time destroy the real time operation of the software application being tested.

4. If several different visual display devices are being tested on the system under test at different times, separate visual display data must be maintained. Updating and managing this data is very time consuming and difficult to automate.

5. The test scripts should be portable. (The intent of this objective is to be able to port test scripts to various operating systems).

SUMMARY OF THE INVENTION

The present invention relates to a method and apparatus for virtually non-intrusively testing hardware and/or software application(s) residing (that is, executing) thereupon. This combination of hardware and software application(s) is called the System Under Test (SUT). By virtually non-intrusive, it is meant that the present invention virtually does not interfere with or affect the performance and behavior of the hardware and/or software application(s) being tested. In addition, the present invention does not employ a fixed-pacing scheme in that the input data is not merely sent to the software application on the SUT at a fixed interval.

More specifically, the present invention relates to a computer program for regression testing (called RT software) which tests hardware and software application(s) running thereupon. In a preferred embodiment, the present invention requires that the SUT includes at least one visual display device.

The present invention and SUT are linked together by a hardware interface device. In the description of the present invention below, the SUT and hardware interface device are collectively referred to as the remote device. It should be noted that in a preferred embodiment, the present invention resides on a host, which is separate and distinct from the remote device.

The computer program which makes up the present invention is formed of a plurality of software modules. In general, a software module, as used herein, can be thought of as some discrete portion of a computer program. Such a discrete portion can potentially be as small as a single instruction, or as large as the whole computer program itself.

In a preferred embodiment, these software modules are configured such that input data and commands which control the remote device can be received from a plurality of input devices. (The combination including commands and input data are referred to herein as composite data). The software modules are also configured to direct the composite data (via signals) to the remote device, and to store the composite data in a test script file. When a specified command is sent to the software application(s) residing on the remote device, it causes the remote device to generate data representative of the data presently residing on the visual display device. This representative data is referred to herein as a signature. The software modules receive at least one signature, and store it in a signature file.

On the command of a user, the software modules send the stored composite data and stored signature(s) to the remote device, causing the remote device to generate at least one new signature. The remote device compares this newly generated signature(s) with the stored signature(s) sent by the software modules. The remote device then sends to the software modules the results of this comparison. A positive result of such a comparison is indicative of the proper functioning of the hardware and software application(s) residing on the remote device.

It may also be desirable to generate and store a new signature(s) if a visual display device different from the one used to generate the stored signature(s) is subsequently attached to the remote device. When indicated by a user, the software modules send the stored composite data and stored signature(s) to the remote device, causing the remote device to generate a new signature(s). However, rather than send comparison results, the remote device sends the software modules new signatures for storing in a signature file.

In this way, the device and method of the present invention allow for virtually non-intrusively testing hardware and/or software application(s) residing thereupon. A more detailed discission of the present invention is set forth below.

BRIEF DESCRIPTION OF THE DRAWINGS

The present invention as defined in the claims can be better understood with reference to the text and to the following drawings:

DETAILED DESCRIPTION OF THE PREFERRED EMBODIMENTS

I. General Overview

Figure 1:
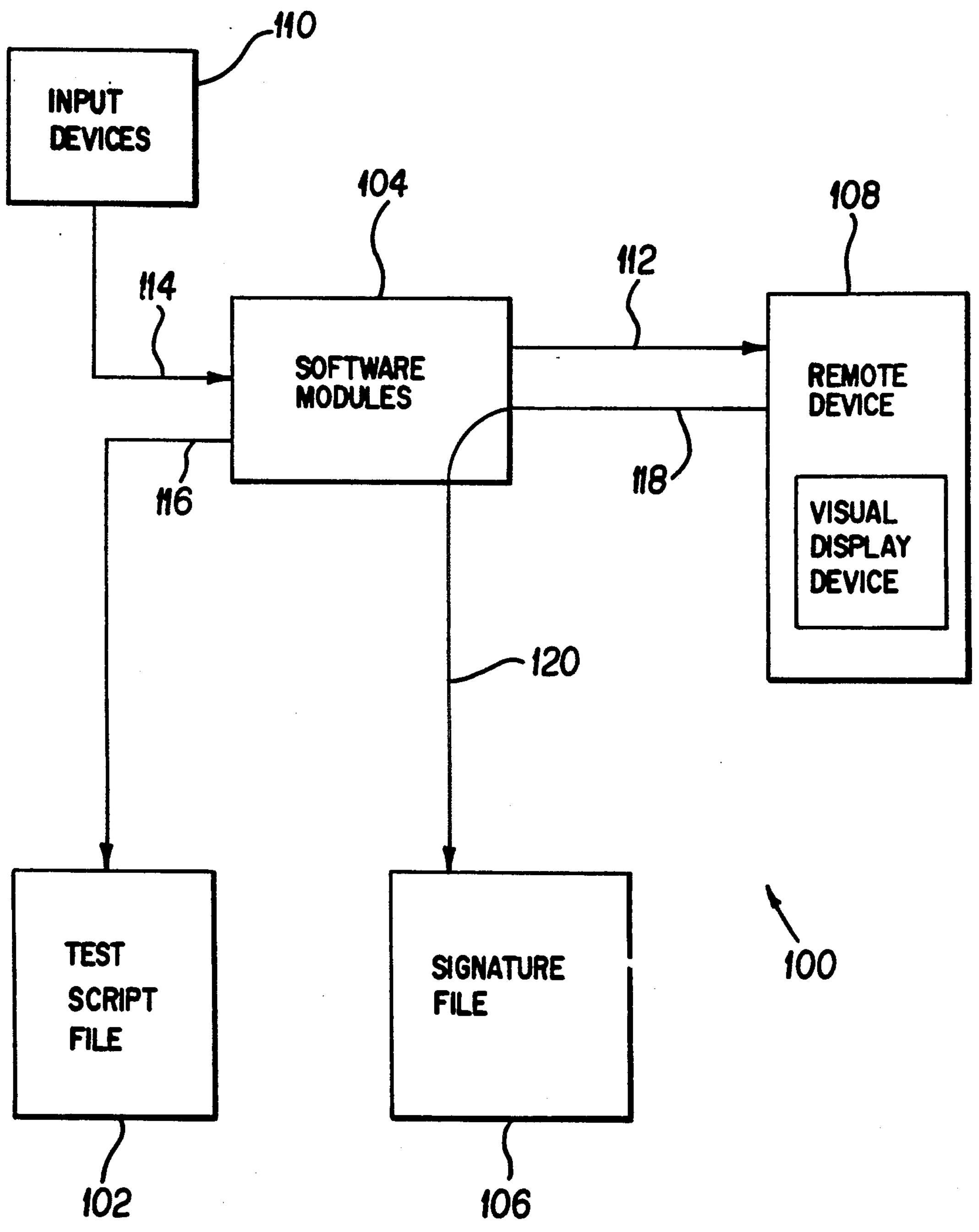
FIG. 1 is a block diagram of the Record Mode of the present invention.

As stated above, the present invention relates to a method and apparatus for virtually non-intrusively testing hardware, and/or software application(s) residing on the hardware. This combination of hardware and software application(s) is called the System Under Test (SUT).

More specifically, the present invention is a computer program for regression testing which tests hardware, and/or software application(s) residing on the hardware. Regarding the explanation of the present invention below, it should be understood that the combination of hardware and software application(s) comprising the SUT, as well as the hardware interface linking the SUT with the present invention, will collectively be termed the remote device.

The regression testing role of the present invention is as follows. In general, when a software application is normally executed on a computer system, a user enters a series of input steps (herein referred to as input data) into the computer in order for the user to manipulate the software application in a desired way.

For example, in a text editor, the input data consists of text, and perhaps certain keystrokes having such functions as causing text to be underlined, or causing a change in the margins of the text. The object of regression testing is to allow a user to enter such input data only once. Thus, in the present invention, input data is recorded, and can subsequently be played back on the software application over and over again, as if a user were actually entering the input data each time. Certain results or data obtained during the original recording phase are then compared by the present invention against results or data obtained during a subsequent playback. The purpose to playing back the input data is that different versions and components of the remote device can be tested against the same input data.

In a preferred embodiment, the present invention (which as stated above relates to a computer program) performs regression testing using a remote device composed of a computer, at least one software application, a visual display device, and an interface between the computer and the present invention. In a preferred embodiment, the present invention is located on a host which is separate and distinct from the remote device. It should be emphasized that in this preferred embodiment, the present invention is in communication with the remote device, but that the remote device is not a part of the present invention.

In operation, the user enters composite data into the present invention via one or more input devices. (In a preferred embodiment, the composite data comprises input data, as well as other components such as commands for controlling certain aspects of the remote device or present invention). As the user enters the composite data, the composite data is recorded, and is simultaneously sent to the software application(s) residing on the remote device. The software application(s) responds to this composite data as if it were entered into the software application(s) directly (that is, not through the present invention). In addition to recording the composite data, the present invention also records representations of visual display data (referred to as signatures) of the visual display device at intervals selected by the user. In order to utilize the present invention, at least one signature should be recorded.

Once the composite data and desired number of signatures are recorded, the present invention allows the composite data to be played back on the software application(s). The stored composite data is sent to the software application(s), which than causes a new signature to be created. The new signature generated by the replaying of the composite data is compared to the corresponding signature(s) previously recorded. If the two sets of signatures do not properly correspond to each other, then that indicates that there is an error in the software application(s) and/or hardware of the remote device. Thus, in the present invention, it is the comparison of signatures which are used to verify that a subsequent replay of composite data caused the remote device to react the same way as when the composite data was originally entered into the remote device.

As indicated above, the primary modes of the present invention are the Record Mode and the Playback Mode. There is also a Regeneration Mode, which is discussed toward the end of this section.

Figure 4:
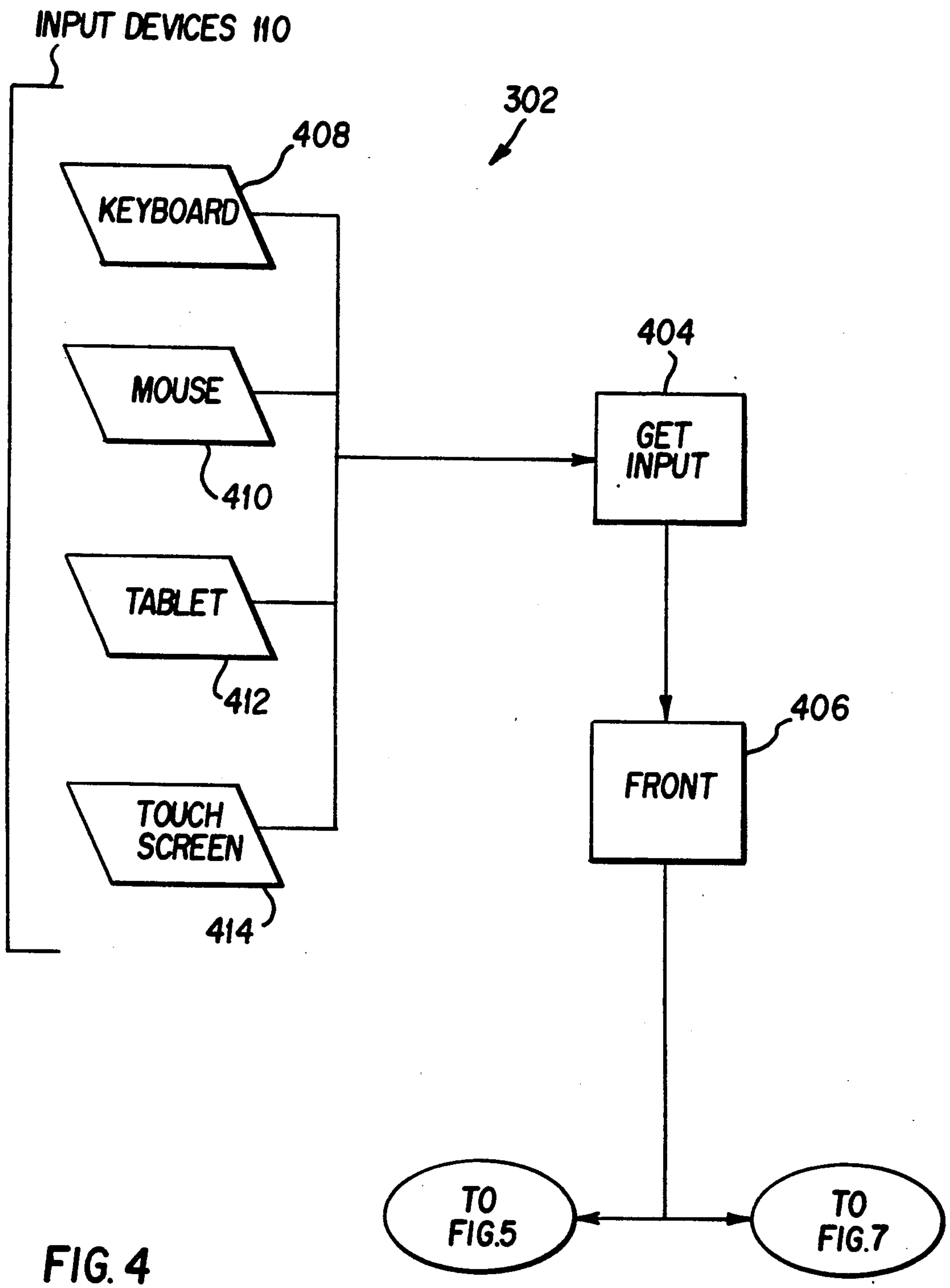
FIG. 4 is a block diagram of the input collection module 302.

The basic operation of the Record Mode of the present invention is now discussed with reference to FIG. 1. In the Record Mode 100, the user (not shown) enters the composite data into the present invention (which is comprised of software modules 104) using one or more input devices 110 (for example, a keyboard 408 or a pointing device 410, as shown in FIG. 4). As is shown in FIG. 1, the composite data travels from the input devices 110 to the software modules 104 via path 114. This composite data can include, for example, special RD/RT (Remote Device/Regression Testing) commands, comments (which are inserted into the stored composite data), and input data (which is generally anything which is not an RD/RT command or a comment). The RD/RT commands are commands which are directed at controlling the remote device 108, or are directed at controlling various aspects of the present invention.

Once the present invention has received composite data from one of the input devices 110, the composite data (minus any comments) is sent to the software application(s) on the remote device 108 via path 112. As the composite data is received by the software application(s), the visual display device on the remote device 108 responds appropriately (that is, the visual display device responds as if the composite data were entered into the software application(s) directly, without first passing through the software modules 104 of the present invention). In addition to routing the composite data to the remote device 108 along path 112, the software modules 104 also cause the composite data (including comments) to be recorded and stored by directing the composite data along path 116. The stored composite data is referred to as a test script, and is stored in a test script file 102. The test script thus contains a sequence of input data, interspersed with RD/RT commands and comments. In a preferred embodiment, the user can designate a name which is to be associated with the test script file 102. In this way, many different test script files 102 can be created.

The most significant of the RD/RT commands is the take-signature command. When this command is entered by a user, it is stored in the test script file 102, and is sent to the remote device 108. The remote device 108 is then induced to generate at least one signature, which is then received by the software modules 104 via path 118. The software modules 104 then store the signature(s) by directing it along path 120. The file in which the signature(s) is stored is referred to as a signature file 106. During the record mode 100, the user can enter the take-signature command as many times as desired, and each time it causes a signature representative of the present visual display data to be sent to the software modules 104, and stored in signature file 106.

The present invention contemplates the use of virtually any type of input device 110, and thus virtually any type or brand of keyboard, pointer device, etc. In order to accommodate these input devices, it is contemplated in a preferred embodiment of the present invention that the composite data is converted into symbolic data so that a specific representation for a particular character or coordinate is uniform regardless of what input device 110 was used. For example, if the letter "A" were entered using a keyboard 408, the result would be that a scan code representative of the letter "A" would be received by the software modules 104. However, different keyboards may produce different scan codes representative of the letter A. Thus, the letter "A" would be converted by the software modules 104 into a particular symbolic representation of the letter "A", and that representation would be the same regardless of the particular keyboard used. It should be understood that the letter "A" or any other composite data can be entered by any number of input devices 110, and converted into symbolic data.

The present invention also contemplates that the software application(s) may produce one or more blinking fields, such as blinking cursors, on the visual display device. The problem with blinking fields is that it is possible for a signature to be generated while the cursor is on, the cursor is off, or some transient state in between.

To represent the signatures most accurately without storing an over-abundance of them, in a preferred embodiment of the present invention, a single take-signature command causes signatures to be generated a given number of times. The number of signatures generated per take-signature command is set by the user. A determination is then made as to which of the signature states are most prevalent. In a preferred embodiment, a histogram is used for this purpose. Only those most prevalent signature states are stored in the signature file 106. The frequency at which signatures are stored can be set by a user.

For example, in the case of a single blinking cursor, most of the time the cursor is either on or off, while only a small fraction of the time it is in a transient state (i.e. neither completely on nor completely off). Consequently, using a histogram as noted above, only a signature representing the cursor fully on or fully off (each of which, for example, may account for 46% of the captured signatures) is stored in the signature file 106. In a preferred embodiment, the present invention always assumes that there may be blinking fields, and a histogram is always produced.

In addition to storing only the most frequently occurring signature(s), the present invention also has the capability of calling for, and receiving signatures representative of only specific portions of visual display data of the visual display device. In a preferred embodiment, the present invention can be set only to call for, and receive representative portions of visual display data comprising specific scan lines of a CRT visual display device. A user sets the first and last scan line to be captured. Consequently, all scan lines between those first and last scan lines are captured and stored in the signature file 106.

Also, the present invention can be set to call for, and receive, signatures representative of only specific planes of the visual display device. For example, in a visual display device which has four planes (for example, red, green, blue and intensity), the present invention can be set to call for, and receive, the signatures representative of only one of the planes (for example, the blue plane).

The present invention is very versatile, in that it can be used to test software application(s) and hardware ranging from microcomputers to supercomputers. Part of this versatility is attributed to its ability to handle a variety of input devices 110. With specific regard to keyboard input, the present invention has the ability to process keyboard signals which do not send composite data to a keyboard buffer. Example of such non-buffered input occurs when the CTRL or ALT keys are pressed in conjunction with other keys.

The present invention allows for two methods which can be used to generate non-buffered keystrokes. The first is to simply press the key or key-combination on the keyboard (for example, CTRL C). This method can create a problem, however, if there are RAM-resident programs residing on the host which respond to those non-buffered keystrokes.

In order to avoid conflicts with RAM-resident devices, the present invention allows a second method of entering non-buffered keystrokes, in which certain composite data can be identified by the present invention as representing a particular non-buffered keystroke. In a preferred embodiment, a special sequence of keystrokes can be entered into the present invention using designated marker keys which designate the beginning and end of the special, sequence of keystrokes. For example, the marker keys can comprise a "<" key to designate the beginning of the special sequence, and a ">" key to designate the end of the special sequence. Thus, to symbolize the pressing of the Ctrl key followed by the letter C, the user would enter "<CTRL C>". It should be understood that a variety of different combinations of keystrokes could be used to represent the non-buffered keys, and that the input device 110 used to represent these non-buffered keystrokes is not limited to a keyboard 408.

As stated above, the present invention allows RD/RT commands to be entered from an input device 110. To demonstrate a preferred method for entering these RD/RT commands, the input of a take-signature command of the present invention is described below. In a preferred embodiment, this RD/RT command would be executed by entering "getcrc" into keyboard 408, and it would be recognized as an RD/RT command by the present invention when it is followed and preceded by a "{cmd}". Thus, the form would be {cmd}getcrc{cmd}. It should be understood, however, that the input of RD/RT commands is not limited to this specific format, and that a variety of input devices 110 can be used to enter such commands.

In a preferred embodiment, comments can be inserted into the test script file 102 in a manner similar to entering the non-buffered keystrokes. Specifically, a "<COMMENT>" marker would be entered at the beginning and end of each comment. Thus, the format to enter a comment would be <COMMENT>comment text<COMMENT>. In addition, the present invention provides for a similar facility to enter a title-type comment into the test script file 102.

Figure 2A:
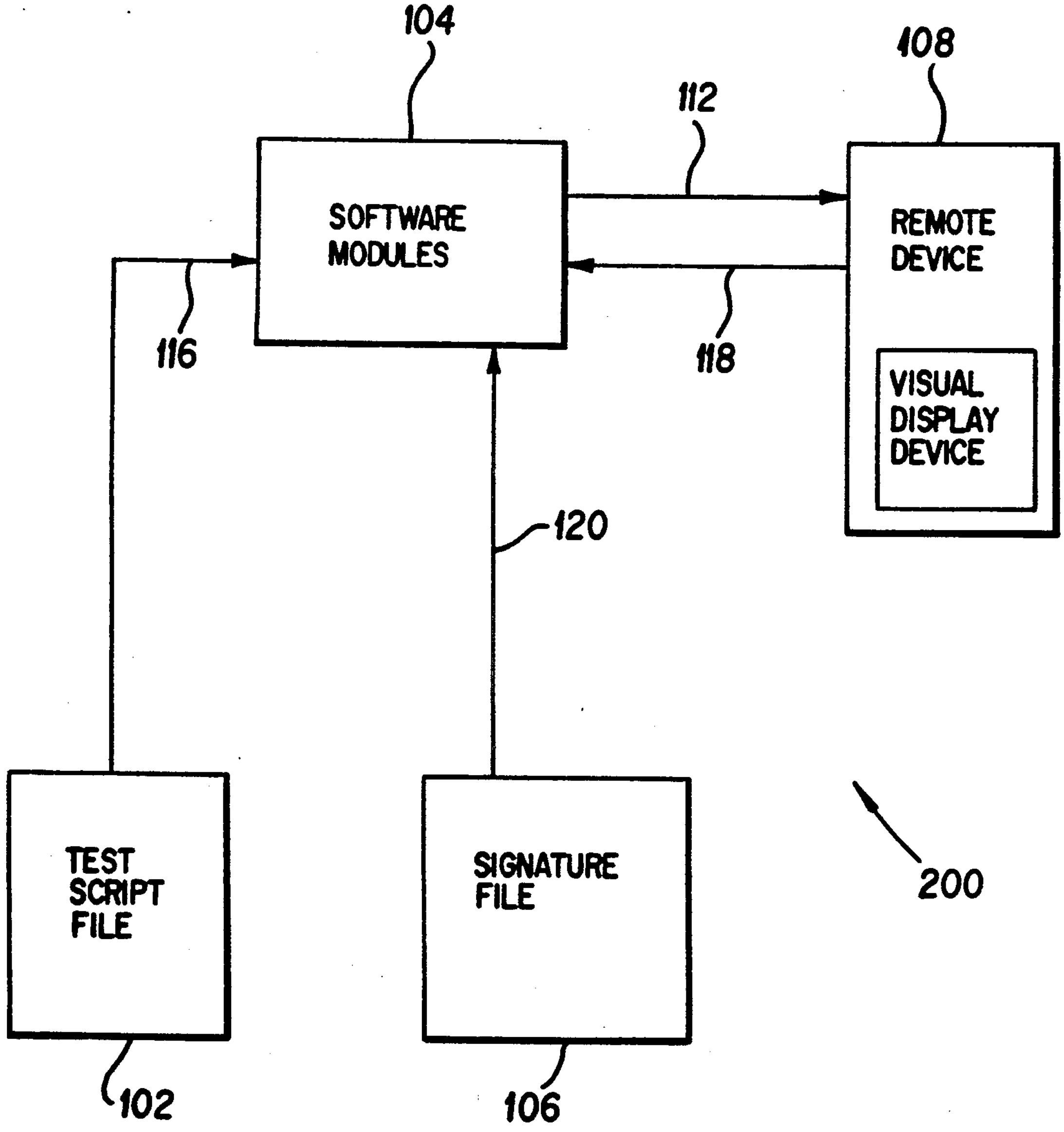
FIG. 2A is a block diagram of the Playback Mode of the present invention.

FIG. 2A shows the basic operation of the Playback Mode 200 of the present invention. Referring to FIG. 2A, the software modules 104 read the stored composite data in the test script file 102 via path 116. This composite data is then sent to the software application(s) residing on the remote device 108 via path 112, in the same sequence as originally entered by the user during the Record Mode 100 in FIG. 1. If all the hardware and software application(s) work properly, the signatures generated during Playback Mode 200 should match corresponding signatures generated during Record Mode 100.

More specifically, when a take-signature command is found in the test script file 102, the software modules 104 send the take-signature command and the associated stored signatures in the signature file 106 to the remote device 108. The stored signatures are read via path 120. The sending of the take-signature command and associated stored signatures to the remote device 108 by the software modules 104 causes the remote device 108 to generate a new signature, and to compare the new signature with the stored signatures passed by the software modules 104. It should be understood that the present invention contemplates that other items or signals can also be sent by the software modules 104 to the remote device 108 to cause the remote device 108 to compare the new signature with the stored signatures. It should further be understood that the comparison of the signatures can be done by the present invention rather than the remote device.

After comparing the new signatures with the stored signatures, the remote device 108 sends back to the software modules 104, via path 118, an indication as to whether the new signature and at least one of the stored signatures are identical. If none of the stored signatures are identical to the new signature, the present invention indicates to the user that an error has occurred.

It may be desired to replay an existing test script and stored signatures using a different visual display device than the one used to originally create the stored signatures. Rather than having a user enter the composite data all over again to create a new signature file 106 for the new visual display device, a preferred embodiment of the present invention provides for a Regeneration Mode 250, as shown in FIG. 2B.

Figure 2B:
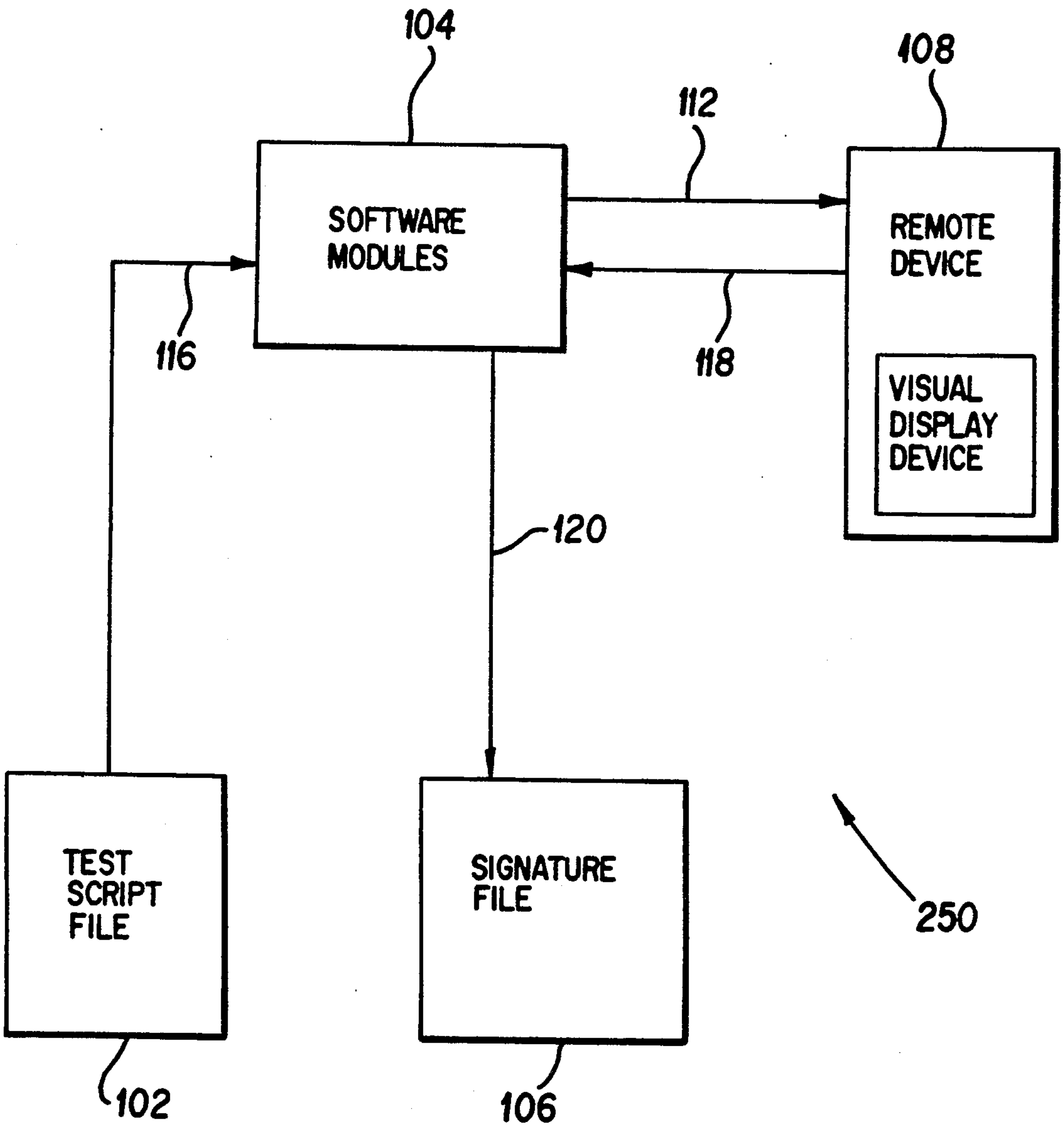
FIG. 2B is a block diagram of the Regeneration Mode of the present invention.

Referring now to FIG. 2B, the Regeneration Mode 250 acts in a similar manner to the Playback Mode 200, in that composite data from the test script file 102 is sent to the remote device 108 by the software modules 104 via paths 116 and 112. However, no signatures are sent to the remote device 108 from the signature file 106, and the remote device 108 sends new signatures created by the new visual display device to the software modules 104 along path 118. These new signatures, via path 120, can then either replace or be stored separately from the original signatures. The signatures can then be used in Playback Mode 200 in conjunction with the original test script file 102 to test software application(s) and/or the hardware which is part of the remote device 108. It should be noted that no comparisons of signatures occur during Regeneration Mode 250.

It should be understood that in a preferred embodiment of the present invention, although the composite data may be in a different format while in different paths of the present invention, that it always maintains the same representation throughout. For example, although the letter "A" may be converted into a symbolic format, it nonetheless maintains its representation as the letter "A." In that sense, the composite data remains consistent throughout the present invention. In addition, it should further be understood that the paths disclosed above comprise a preferred embodiment of the present invention, and that the present invention contemplates other path configurations as well. Also, as used herein, the term "responsive" means that a particular module or step of the invention interacts with or responds to, either directly or indirectly, another module or step of the invention.

II. Architectural Overview

Figure 3:
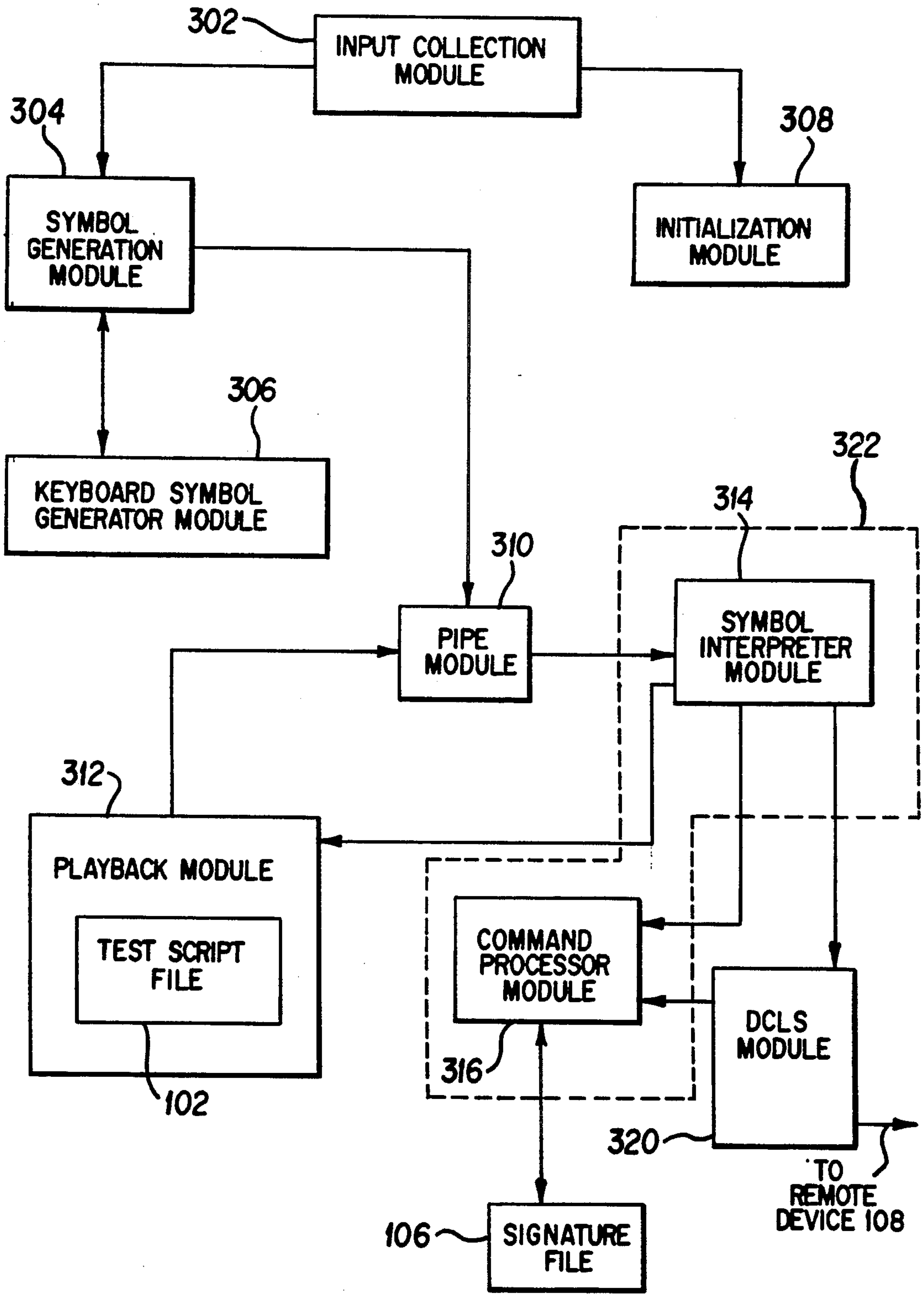
FIG. 3 is a block diagram of the software modules and associated files of the present invention.

An overview of a preferred embodiment of the software modules 104 of the present invention will now be described. FIG. 3 is a high level block diagram of the logical arrangement of the software modules 104 and associated files. The arrangement of these software modules 104 is a preferred embodiment, and it should be understood that different arrangements of the modules and their constituent sub-modules can also be implemented.

Referring to FIG. 3, an input collection module 302 is used to obtain composite data from a user. The input collection module 302 is capable of obtaining input from any number of input devices 110, including keyboards 408, a mouse 410 or other pointer devices, as shown in FIG. 4.

After the composite data has been obtained by the input collection module 302, it is then sent to a symbol generation module 304, which determines the type of input device from which the composite data came. If the composite data originated from one of the input devices 110 other than a keyboard 408, the symbol generation module 304 converts the composite data into symbolic data. As stated above in the General Overview section, this symbolic data provides for a consistent representation of the composite data regardless of which specific input device 110 is used to enter the data.

If the composite data came from a keyboard 408, then the composite data is directed to a keyboard symbol generator module 306. The keyboard symbol generator module 306 takes the composite data from the keyboard, and converts it into symbolic data. In making this conversion, the keyboard symbol generator module 306 has the ability to convert into symbolic data such "special case" keys as the CTRL and ALT key combinations of various keyboards.

Regarding the embodiment of the present invention discussed above, the input collection module 302, input distribution module 304 and keyboard symbol generator module 306 are modules used during the Record Mode 100 of the present invention. Most of the modules that follow in the description of FIG. 3 are used in all three modes contemplated in a preferred embodiment of the present invention.

After composite data from the input devices 110 has been converted into symbolic data via the keyboard symbol generator module 306 or the symbol generation module 304, the composite data (now in symbolic form) is feed into a pipe module 310 for distribution to a parser 322. In a preferred embodiment, this pipe module 310 is necessary when the present invention is running on an operating system which does not have full piping, such as Microsoft DOS. However, in an operating system where full piping is implemented, such as UNIX, the composite data can be piped directly to the parser 322, without the use of a module such as the pipe module 310.

In a preferred embodiment, the parser 322 is a top down recursive descent parser. The functions of this parser 322 are to determine what type of composite data has been received from the pipe module 310, and to process this composite data. As stated above, in a preferred embodiment, there are three general types of composite data which the parser 322 can receive. These three types are RD/RT commands, comments, and input data which are neither RD/RT commands nor comments (that is, anything else). The parser 322 checks to see which type of composite data it has received.

In a preferred embodiment, the parser 322 can be broken up into two main modules, a symbol interpreter module 314 and a command processor module 316. The symbol interpreter module 314 is the portion of the parser 322 which first receives the composite data from the pipe module 310, and checks to see which type of composite data it is. It then sends the composite data to the appropriate location depending on its whether the composite data is a command, a comment, or input data.

If the symbol interpreter module 314 received input data during Record Mode 100, two events occur. The input data is directed to a DCLS module 320 (data-communications library set), and it is also directed to a test script file 102 in a playback module 312 to be later used during Playback Mode 200. During Playback Mode 200 or Regeneration Mode 250, the input data is sent only to the DCLS module 320.

Upon receiving input data, the DCLS module 320 sends the input data to the software application(s) residing on the remote device 108. The DCLS module 320 is the interface module which links the present invention with the remote device 108. All communications between the remote device 108 and the present invention involve the DCLS module 320.

If the symbol interpreter module 314 receives a comment, this comment is also directed to the test script file 102 of the playback module 312. The comment is not sent to the remote device 108, and is only used to allow a user to document the contents of the test script file 102 so that the file can later be analyzed and understood. It should be noted that comments are not used by the present invention during Playback Mode 200 or Regeneration Mode 250.

Upon receipt of an RD/RT command by the symbol interpreter module 314, the command is passed to a command processor module 316. The command processor module 316 then processes the command passed to it, along with implementing any associated parameters. For those RD/RT commands which control the remote device 108, the command processor module 316 generates appropriate signals to be sent to the remote device 108.

Regarding the processing of the take-signature command, the command processor module 316 passes the take-signature command to the remote device 108 via DCLS module 320. During the Record Mode 100, the command simultaneously is stored in the test script file 102. During the Record Mode 100 and Regeneration Mode 250, the remote device 108 then passes the signatures back to the command processor module 316, and the signatures are then stored in the signature file 106.

When the take-signature command is stored in the test script file 102, a take-signature command marker is stored with it. The purpose of the take-signature command marker is to identify which take-signature command may have caused an error (an error being when a comparison during Playback Mode 200 between the stored signatures and new signature failed).

In a preferred embodiment of the present invention, the signals sent to the remote device 108 are confirmed by the remote device 108 as having been received. In one embodiment, the remote device 108 sends the DCLS module 320 an ASCII "+" if the transmission was properly received, and a "−" if it was not properly received. The receipt of a "−" causes the DCLS module 320 to re-transmit the signal, and/or cause an error message to be generated.

In the Playback Mode 200, the playback module 312 takes the composite data in the test script file 102, and sends it to the pipe module 310, which then sends the composite data to the parser 322. As noted above, this test script file 102 contains keystrokes, pointer movements, etc., as well as RD/RT commands, all of which are in symbolic format. Thus, regarding the format of the data, the parser 322 need not be concerned as to which mode the present invention is running, since the input received is in the same symbolic format regardless of the mode. Of course, the parser 322 processes the composite data differently in certain respects during Playback Mode 200 as opposed to Record Mode 100. For example, input data received by the parser 322 during Playback Mode 200 is not stored again in the test script file 102, as would occur during Record Mode 100.

As indicated above, input data received by the parser 322 is sent to the remote device 108. This causes the software application(s) to function as though a user were directly entering the input data to the remote device 108 without routing it through the present invention. During Playback Mode 200, when the parser 322 receives a take-signature command, the command processor module 316 is directed to read the appropriate signature(s) in the signature file 106 (that is, those signatures that were originally obtained during the input of that particular take-signature command), and to send those signature(s) to the remote device 108. The remote device 108 then generates a new signature representative of the visual display data presently residing on the visual display device, and compares the new signature with signature(s) sent to the remote device 108. The remote device 108 then sends the results of the comparison back to the DCLS module 320 of the present invention.

In addition to a single test script file 102, an initialization module 308 containing pre-stored composite data can be utilized by the present invention during Record Mode 100. The purpose of this is to create a set of composite data which will be frequently used by a user, typically for initialization purposes during the Record Mode 100 operations. This means that the user does not have to enter this set of composite data during each Record Mode 100 session. By entering an RD/RT command during the Record Mode 100, this pre-stored composite data is sent to the remote device 108, and to the test script file 102, just as though the composite data had been directly input by a user. Of course, the pre-stored composite data must first have been previously entered into the initialization module 308. In a preferred embodiment, this can be accomplished by using the Record Mode 100 to create a test script file 102. Once created, this test script file 102 can then be used as the pre-stored composite data in a subsequent execution of the Record Mode 100.

With regard to Regeneration Mode 250, as discussed in the General Overview section above, this mode 250 acts in a similar manner to the Playback Mode 200. The difference is that rather than sending the DCLS module 320 the results of the comparison, the remote device 108 sends new signatures representative of the visual display data from the new visual display device. These new signatures are stored in a signature file 106.

III. Architecture In More Specific Detail

The RT software of the present invention is now described in greater detail.

FIG. 4 is a more detailed representation of the input collection module 302 discussed above. Referring to FIG. 4, it is seen that the present invention accepts input from a number of input devices 110, which can include a keyboard 408, mouse 410, tablet 412, and touch screen 414. While these input devices 110 are contemplated in a preferred embodiment of the present invention, it should be understood that any type of input device can be used.

Activation of one of these input devices 110 by a user induces a get input sub-module 404 to capture the composite data from the input device 110, and to pass the data to the next module of the present invention. The get input sub-module 404 takes care of the details associated with specific input devices 110, so that the other modules of the present invention need not be concerned with these details.

In a preferred embodiment of the present invention, the get input sub-module 404 itself comprises a plurality of sub-modules, each one designed to process the input signals generated by specific input devices 110. For example, if it were contemplated that a mouse device 410 would be used as one of the input devices 110, then the get input sub-module 404 would contain a mouse sub-module. Again, it should be understood that any type of input device 110, and associated input device specific sub-module can be used with the present invention.

A front module 406 is the mechanism which activates the get input module 404 when it receives interrupts generated by an input device 110. When an input device 110 is activated, the front module 406 determines which input device 110 was activated, and signals the get input module 404 to receive the appropriate composite data.

Once the composite data has been obtained by the input collection module 302 (see FIG. 3), the composite data is then directed to the symbol generation module 304. A more detailed representation of the input distributor 304 is shown in FIG. 5.

Figure 5:
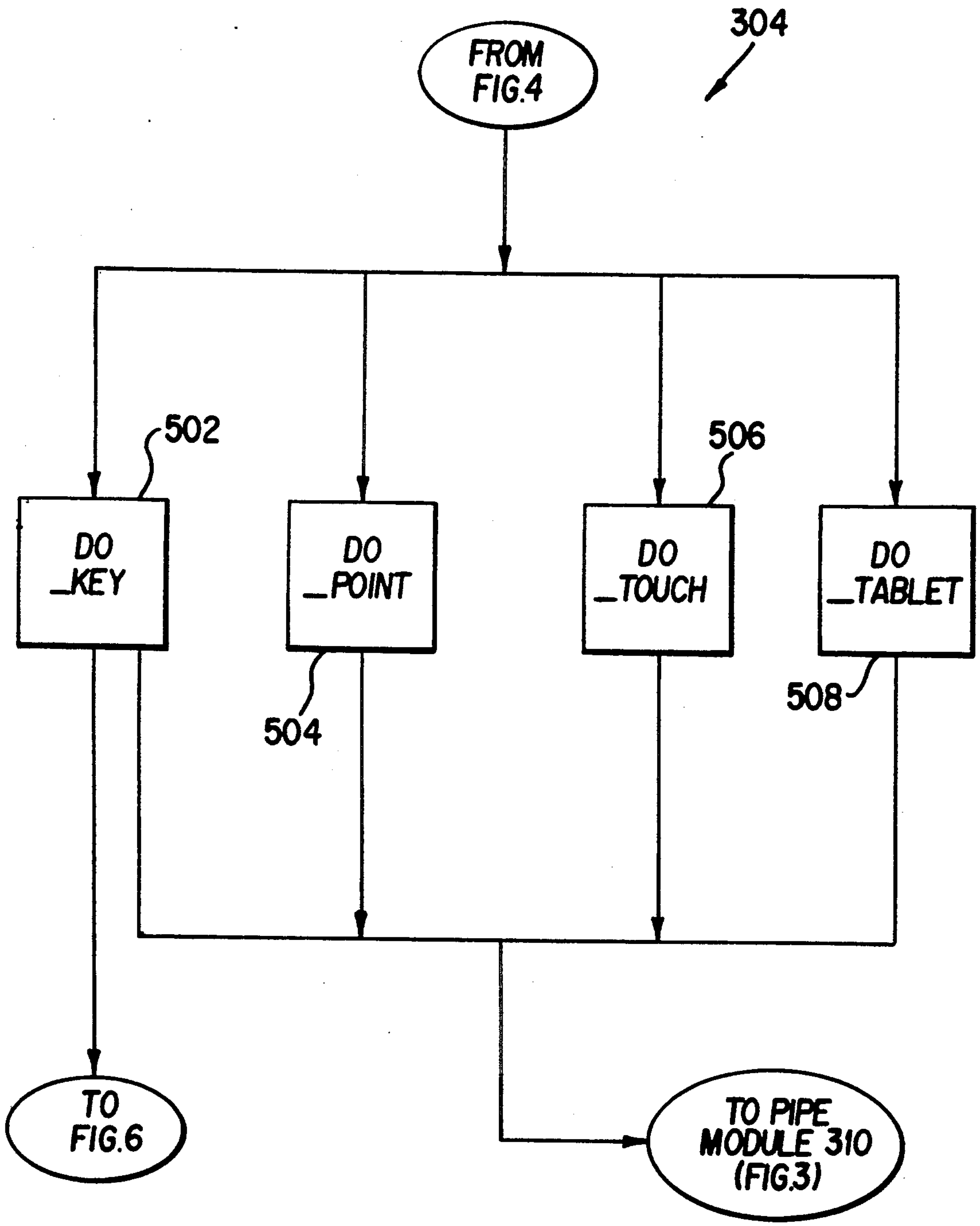
FIG. 5 is a block diagram of the symbol generation module 304.

Referring now to FIG. 5, depending on the input device 110 (see FIG. 4) from which the composite data originated, one of the do $_{13}$ sub-modules shown in FIG. 5 converts the composite data into a symbolic format (symbolic data). For example, a do_point module 504 converts the composite data from a pointer device into symbolic format. Similarly, a do_touch module 506 converts composite data from a touch screen into symbolic data, and a do_tablet module 508 converts composite data received from a tablet device such as a digitizer pad into symbolic data. All these do_sub-modules (502, 504, 506, 508) shown in FIG. 5 are used in a preferred embodiment of the present invention. It should be understood that any number of do_sub-modules can be used, the exact number depending upon the number of input devices 110 contemplated for use by the user of the present invention.

The composite data is converted into symbolic format so that the data representing a particular event is the same regardless of the type of specific device used. For example, as explained in the General Overview section above, one keyboard may represent the letter "A" with a particular scan code, while a different keyboard may use a different scan code for the same letter. The present invention converts both of those scan codes into the same symbolic data, representative of the letter "A."

In a preferred embodiment, most of the do_sub-modules do the actual conversion of composite data into symbolic data. The do_key sub-module 502, however, contains conversion tables for various keyboards for converting the composite data (typically a scan code) from those keyboards into symbolic data. Upon receipt of composite data from a keyboard 408, the do_key sub-module 502 sends this composite data along with the appropriate conversion table to the keyboard symbol generator module 306 (see FIG. 3) for conversion.

Figure 6:
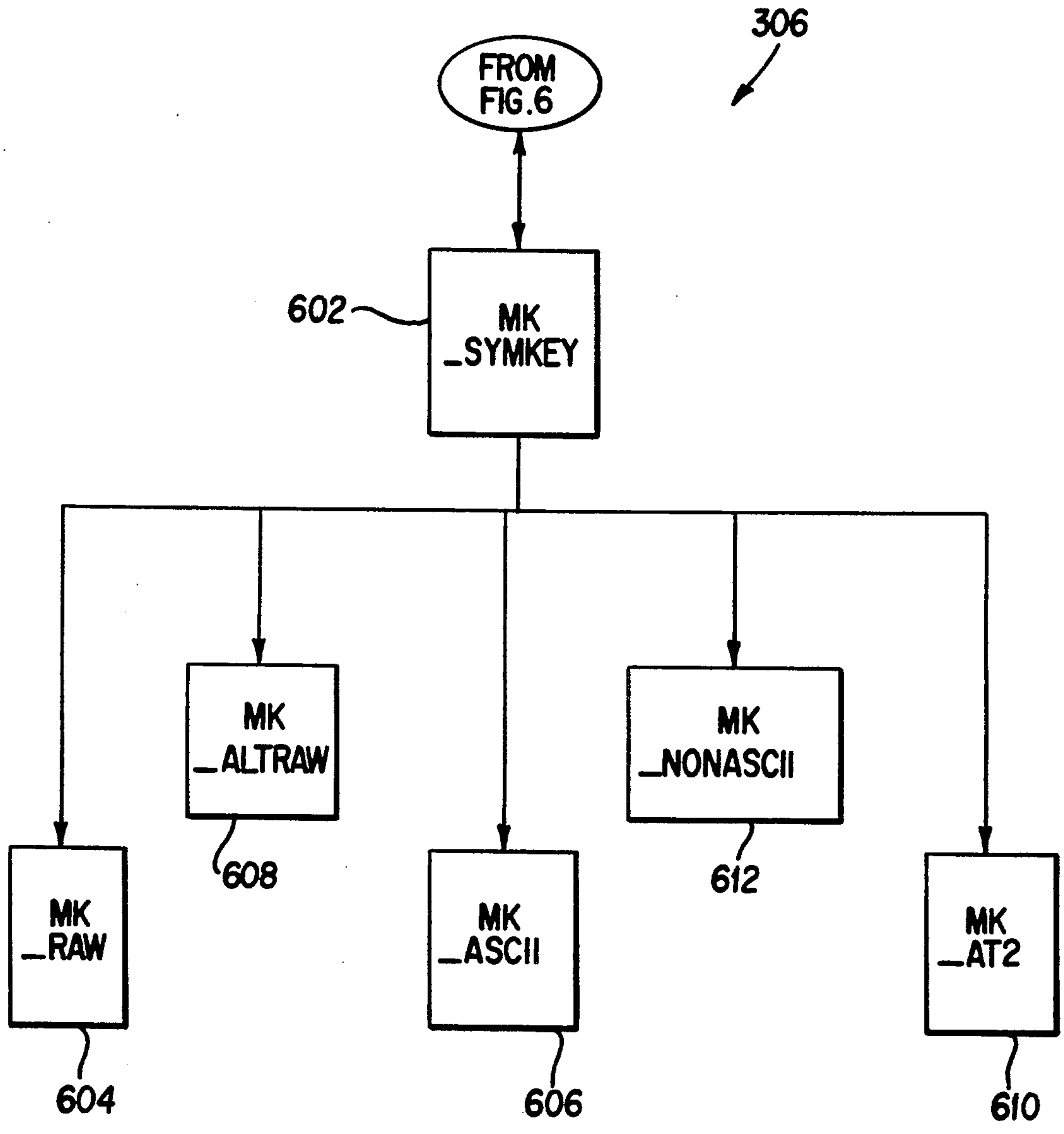
FIG. 6 is a block diagram of the keyboard symbol generator module 306.

A preferred embodiment of the keyboard symbol generator module 306 is shown in detail in FIG. 6. This embodiment relates specifically to XT and AT2 microcomputer keyboards manufactured by IBM, and to microcomputer keyboards manufactured by Hewlett Packard. It should be understood that these sub-modules within the keyboard symbol generator module 306 shown in FIG. 6 represent a preferred embodiment of the present invention, and that other modules can easily be implemented and used if other keyboards are used as input for the present invention.

The function of the keyboard symbol generator module 306 is to process the "special cases" of composite data of various keyboards. A typical example of a "special case" would be control (CTRL) characters. All sub-modules in the keyboard symbol generator module 306 send the symbolic data back to the do_key sub-module 502 in the symbol generation module 304, after converting the composite data to symbolic format.

Referring again to FIG. 6, the composite data from a keyboard 408 is first sent from the do_key sub-module 502 to a MK_symkey sub-module 602. The MK_symkey sub-module 602 determines which type of special case (if any) the composite data is, then sends the composite data to the appropriate sub-module of the keyboard symbol generator module 306. The simplest case is where the composite data represents an ASCII character. In that case, the composite data is sent to a MK_ASCII sub-module 606. This MK_ASCII sub-module 606 takes in the composite data and converts it into symbolic format. This symbolic format is then sent back to the do_key sub-module 502, which then sends it to the pipe module 310.

If the keyboard input was a non-ASCII character such as a CTRL key, or an ALT key, then the composite data would be directed to a MK_non-ASCII sub-module 612.

A MK_altraw sub-module 608 converts composite data which is generated from pressing down the ALT key, and entering a number. This has the effect of converting the number which was input to the ASCII character which that number represents.

A MK_raw sub-module 604 converts the non-input data which is not recognizable with regard to which key was pressed (that is, an illegal scan codes), but which is nonetheless converted into symbolic data since it may be recognizable by the remote device 108.

A MK_AT2 sub-module 610 converts those scan codes which are received from an AT2 keyboard.

Except for the pipe module 310, those modules previously described in this section relate primarily to the Record Mode 100 of the present invention. The modules referred to below relate to all modes of the present invention.

Figure 8:
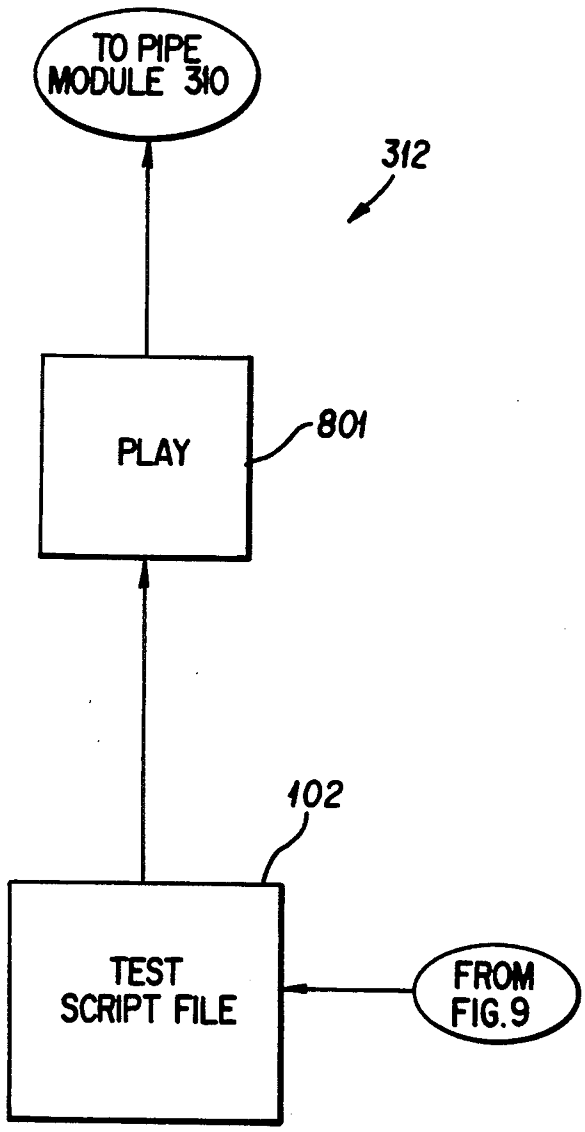
FIG. 8 is a block diagram of the playback module 312.

Referring again to FIG. 3, it can be seen that the pipe module 310 accepts input from modules relating to both the Record Mode (that is, modules 302, 304 and 306) and Playback Mode (that is, module 312 as shown by FIG. 8). More specifically, composite data from the symbol generation module 304 (now in symbolic form) and composite data from the test script file 102 feed into the pipe module 310. The composite data is then sent to the parser 322. Since the composite data in the test script file 102 was processed through the symbol generation module 304, the format of the composite data sent to the parser 322 is the same format for both play mode 200 and Record Mode 100.

Still referring to FIG. 3, the parser 322 comprises a symbol interpreter module 314 and a command processor module 316. As stated above, the symbol interpreter module 314 interprets whether composite data from the pipe module 310 is a comment, an RD/RT command, or input data. If the composite data is an RD/RT command, then the command processor module 316 receives the command from the symbol interpreter 314, decides which RD/RT command it is, and then processes that command.

Figure 9:
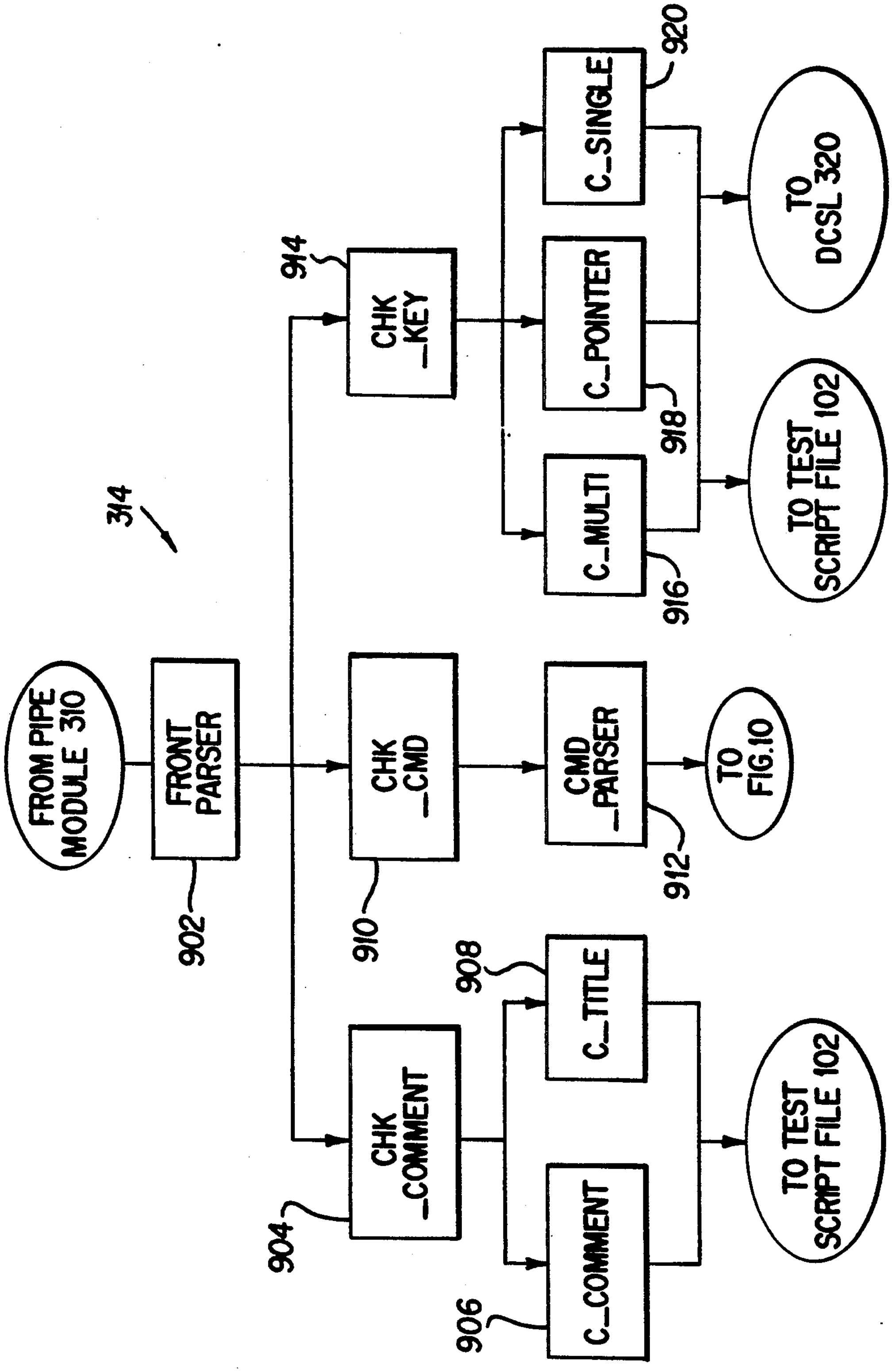
FIG. 9 is a block diagram of the symbol interpreter module 314.

FIG. 9 shows a detailed representation of a preferred embodiment of the symbol interpreter module 314. A front parser module 902 receives the composite data from the pipe module 310, and distributes this composite data to "CHK" modules (904, 910, 914), to determine the type of composite data received.

A CHK_comment sub-module 904 checks to see if the composite data received is a comment. In a preferred embodiment, a comment can be either a title for a test script file 102, or it can be purely informational material. If the CHK_comment sub-module 904 determines that the composite data received by the symbol interpreter module 314 is in fact a comment, then a C_Title sub-module 908 determines if the comment is a title. If it is a title, then the title is sent to the test script file 102. If the comment is informational material, then a C_comment sub-module 906 sends the text of the comment to the test script file 102.

A CHK_cmd sub-module 910 checks the composite data received by the symbol interpreter module 314 to see if the composite data is an RD/RT command. If the CHK_cmd sub-module 910 determines that a command has been received, it sends the command to a CMD_parser sub-module 912, which verifies that a correct command was, in fact, received. The CMD_parser sub-module 912 then sends the command to the appropriate sub-module in the command processor module 316 for processing.

A CHK_key sub-module 914 receives the composite data which is neither an RD/RT command nor a comment, but which is input data to be sent to the software application(s) residing on the remote device 108. Once the CHK_key sub-module 914 has determined that the composite data sent to the symbol interpreter module 314 is input data, it then determines which input device 110 the data has been sent by, and directs the composite data to one of three sub-modules (916, 918, 920), which translate the composite data into a format recognizable by the remote device 108.

As stated in the General Overview section above, a special sequence of keystrokes can be input entered represents a specific keyboard key (for example, <CTRL C>) without conflicting with potential RAM-resident programs on the host. If the composite data received by the symbol interpreter module 314 is one of these special sequences, then the CHK_key sub-module 914 directs the composite data to a C_multi sub-module 916. The C_multi sub-module 916 then sends the processed composite data to the remote device 108, as always (in a preferred embodiment), via the DCLS module 320.

If the input was from a pointer device such as a mouse or a touch screen, then the $CHK_{13}$ key sub-module 914 sends the composite data to a C_pointer sub-module 918 for processing. The C_pointer sub-module 918 then sends the processed composite data to the remote device 108.

IF the composite data is neither a special sequence of characters nor from a pointer device, then the composite data is, by default, processed by a C_single sub-module 920. This is the sub-module which processes single keystrokes. Again, the processed composite data is sent to the remote device 108.

In the case of comments and input data, the symbol interpreter module 314 is the final processing module before the composite data is forwarded to its ultimate destination (either the remote device 108 or the test script file 102). RD/RT commands, however, are forwarded to the command processor module 316, a preferred embodiment of which is represented by FIG. 10.

Figure 10:
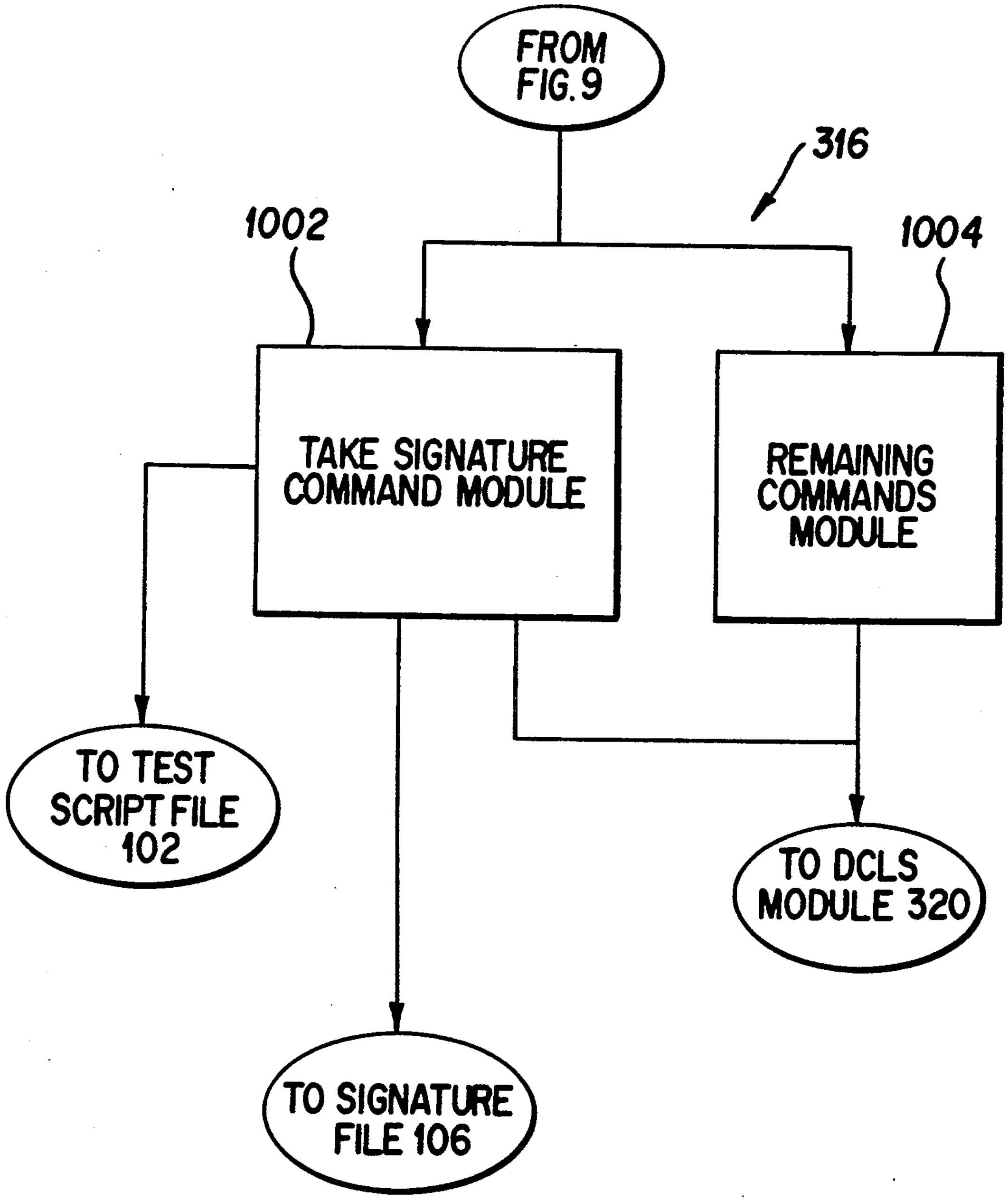
FIG. 10 is a block diagram of the command processor module 316.
Figure 11:
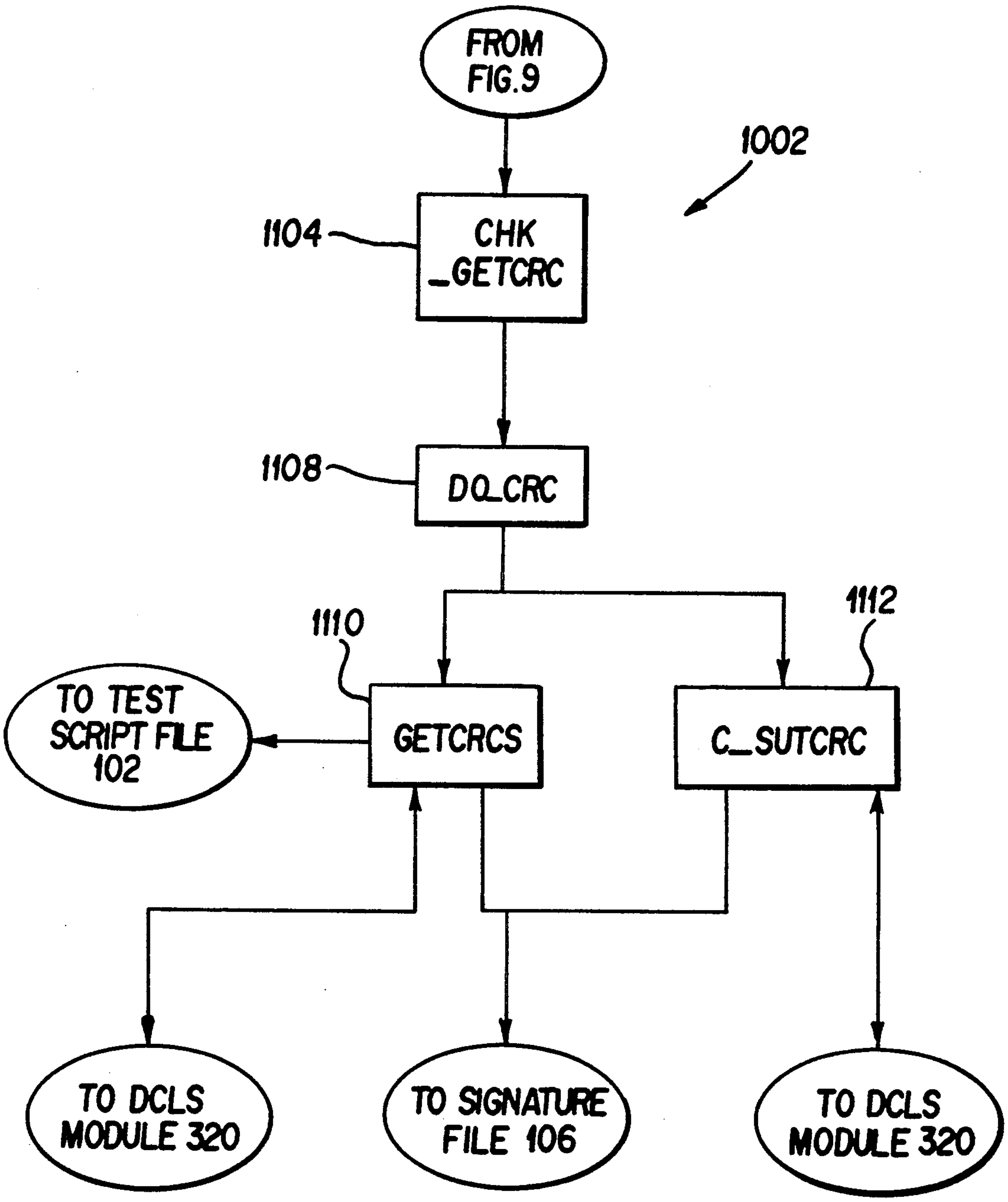
FIG. 11 is a block diagram of the take signature command module 1002.

Referring now to FIG. 10, the command processor module 316 can be broken up into two other modules, a take-signature command module 1002, and a remaining commands module 1004. As the name implies, the take-signature command module 1002 processes the take-signature command, while the remaining commands module 1004 processes all RD/RT commands other than the take-signature command. FIG. 11 shows a more detailed representation of the take-signature command module 1002.

Referring now to FIG. 11, the sub-module which first processes the take-signature command is a CHK_getcrc sub-module 1104. This sub-module first receives the take-signature command from the CMD_parser module 912 (see FIG. 9), and then determines whether or not a valid take-signature command has been received. If the take-signature command is valid, the CHK_getcrc sub-module 1104 then processes parameters which were entered by the user relating to the take-signature command. In a preferred embodiment, one such parameter relates to how many signatures representative of the visual display device are to be sent to the present invention to create the histogram, as described in the General Overview section above. Another such parameter used primarily during Playback Mode 200 sets the amount of time which the present invention waits for a response from the remote device 108, before the comparison test is deemed to have failed.

After the parameters have been processed by the CHK_getcrc sub-module 1104, the take-signature command is then processed by a DO_CRC sub-module 1108, which determines the mode of operation that the present invention is presently in. As stated above, in a preferred embodiment, the three modes of the present invention are Record Mode 100, Playback Mode 200, and Regeneration Mode 250. If the mode is designated as either Record Mode 100 or Regeneration Mode 250, then the take-signature command is directed to a getcrcs sub-module 1110.

In Record Mode 100, the getcrcs sub-module 1110 sends a take-signature command to both the remote device 108 (via DCLS Module 320) and to the test script file 102. The getcrcs sub-module 1110 then receives the signature(s) from the remote device 108, and saves the signature(s) in the signature file 106. In addition, a take-signature command marker is also inserted into the test script file 102 during Record Mode 100. This marker enables the present invention to detect which of the take-signature commands caused an error with regard to the comparison of the signature(s) during Playback Mode 200.

During Playback Mode 200, a C_SUTCRC sub-module 1112 also sends the take-signature command to the remote device 108. However, in Playback Mode 200, signature(s) from the signature file 106 are sent to the remote device 108, and comparison results rather than signature(s) are returned.

In a preferred embodiment, the getcrcs sub-module 1110 is also used to compute the histograms of each of the signature results, in order to determine the frequencies of various states of the visual display device. As described above, only the most frequently occurring signature(s) are stored in the signature file 106. Thus, where a visual display device is displaying a blinking cursor, only the signatures representative of when the cursor is on, and when the cursor is off, are stored in the signature file 106.

If the mode is designated as Regeneration Mode 250, then the take-signature command is directed to the getcrcs sub-module 1110. This sub-module 1110 receives the new signature(s) from the remote device 108 which were produced as a result of the test script from the test script file 102 being sent to the remote device 108. This new signature(s) is then stored in a new file or in the original signature file 106.

In addition to the take-signature command, a preferred embodiment of the present invention contemplates other RD/RT commands which can be entered by a user. While some of these commands are listed below, it should be understood that this is not a complete list of such commands, and that other commands having other functions can also be used with the present invention. As stated above, the module used in the processing of these commands is the remaining commands module 1004, which is shown in greater detail in FIG. 12.

Figure 12:
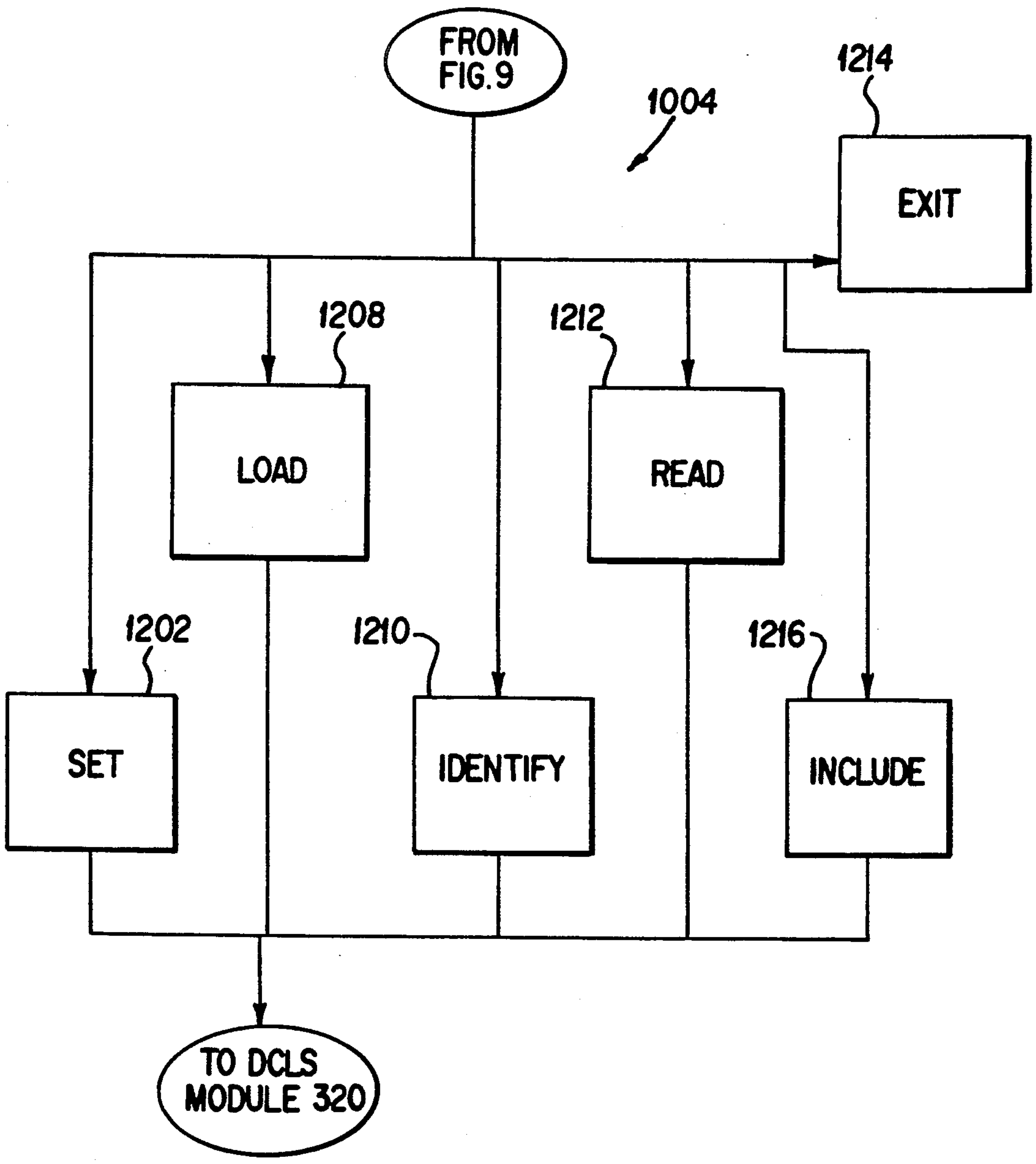
FIG. 12 is a block diagram of the remaining commands module 1004.

Referring now to FIG. 12, one of the RD/RT commands contemplated by the present invention is a set command and associated set command module 1202, which allows for the setting of specific options relating to the remote device 108. For example, in a preferred embodiment, when composite data representative of a keystroke is sent to the remote device 108, the duration for which the keystroke was pressed can vary. The set command processed by the set sub-module 1202 allows the apparent length of the duration of the key press to be adjustable. Similar types of delays can also be adjusted for pointer devices. As stated in the General Overview section above, the set command also allows a user to restrict the capture of the representative signature to only certain planes of the visual display device.

An include command and associated include sub-module 1216 allows a user to determine which scan lines are captured on the visual display device. After the command is processed, the output is sent to the remote device 108 (via DCLS Module 320).

A load command and associated load sub-module 1208 allows for the processing of specific routines which a user can load from the present invention, directly into RAM memory in the remote device 108. This allows a sophisticated user to write custom routines, which are not otherwise within the remote device 108.

An identify command and associated identify sub-module 1210 displays to a user the current settings as implemented by the set command.

Figure 7:
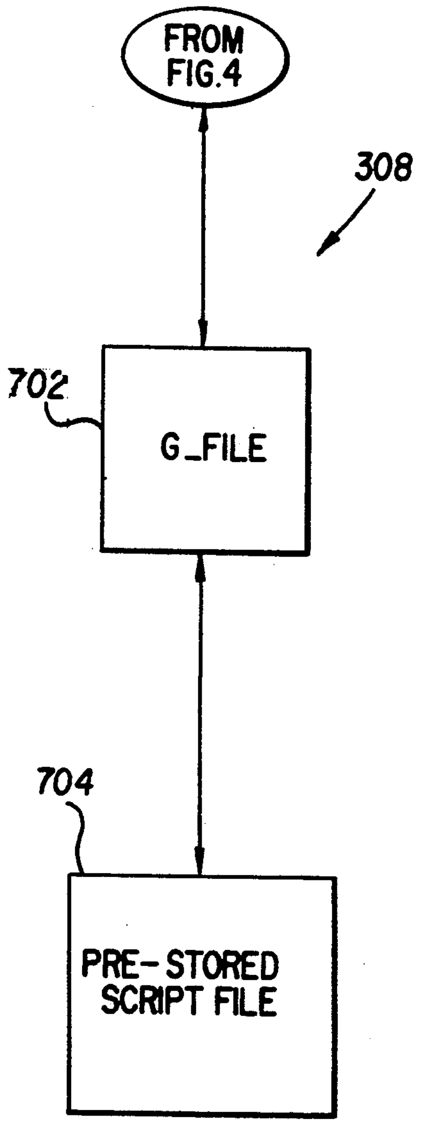
FIG. 7 is a block diagram of the initialization module 308.

The read command and associated read sub-module 1212 causes the pre-stored composite data in the initialization module 308 to be read into the remote device 108, as described in the Architectural Overview section above. In a preferred embodiment, the pre-stored composite data in the initialization module 308 is copied into the test script file 102 when a user inputs the read command. Thus, the initialization module acts as a kind of macro. Referring to FIG. 7, a G_file sub-module 702 reads the contents of a pre-stored script file 704 and sends it to the remote device 108, and to the test script file 102. It should be understood, however, that a pointer to the pre-stored composite data, rather than the pre-stored data can be included into the test script file 102 upon input of the read command. In this way, the only copy of the pre-stored composite data is in the initialization module, where it will act as a kind of subroutine.

The exit command 1214 merely exits from the present invention, and returns control to the operating system upon which the present invention operates.

It should be understood that the present invention is not limited to its preferred embodiments, and that the examples presented above are merely for the purposes of illustration. The scope of the present invention should therefore be interpreted by the following claims as defined by the forgoing figures and text.

What we claim is:

1. A computer hardware and software testing method, comprising the steps of:

(1) receiving composite data from at least one input device;

(2) storing said composite data to thereby form stored composite data;

(3) sending said composite data to a remote device having at least one visual display device;

(4) receiving at least one signature from said remote device in response to said composite data;

(5) storing said at least one signature wherein said at least one signature has a selected prevalence to thereby form at least one store signature;

(6) sending said at least one stored signature and said stored composite data to said remote device, thereby creating at least one new signature; and (7) receiving a signal from said remote device indicating identity or non-identity between said at least one stored signature and said at least one new signature.

2. The method of claim 1, wherein said step (1) comprises the step of receiving composite data comprising input data, commands, and/or comments.

3. The method of claim 1, further comprising the step of said at least one signature having a selected prevalence being selected using a histogram.

4. The method of claim 1, further comprising the step after said step (1) of translating said composite data into a symbolic format, wherein said symbolic format provides for a consistent representation of composite data regardless of which of said at least one input device is used.

5. The method of claim 1, wherein said step (4) comprises the step of receiving said at least one signature from said remote device which is representative of only a selected portion of visual display data of said at least one visual display device.

6. The method of claim 1, wherein said step (1) comprises the step of receiving a special sequence of said composite data, and translating said special sequence into a selected composite data representation recognizable by said remote device.

7. A computer hardware and software testing method, comprising the steps of:

(1) sending stored composite data and at least one stored signature, said at least one stored signature having been stored due to being received with a selected prevalence from a remote device, to said remote device having at least one visual display device, said stored composite data causing said remote device to generate at least one new signature; and (2) receiving a signal from said remote device indicating whether said at least one store signature and said at least one new signature are identical, or not identical.

* * * * *